(12) United States Patent
Yoo (10) Patent No.: US 12,405,834 B2
(45) Date of Patent: Sep. 2, 2025

(54) INTEGRATED CLUSTERING SYSTEM

(71) Applicant: Foundation of Soongsil University-Industry Cooperation, Seoul (KR)

(72) Inventor: Myungsik Yoo, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 597 days.

(21) Appl. No.: 17/867,705

(22) Filed: Jul. 19, 2022

(65) Prior Publication Data

US 2023/0107625 A1    Apr. 6, 2023

(30) Foreign Application Priority Data

Sep. 27, 2021 (KR) .......................... 10-2021-0127379

(51) Int. Cl.
*G06F 9/50* (2006.01)
*H04L 41/08* (2022.01)
*H04L 41/0803* (2022.01)
*H04L 41/0893* (2022.01)

(52) U.S. Cl.
CPC ............ *G06F 9/5072* (2013.01); *H04L 41/08* (2013.01); *H04L 41/0803* (2013.01); *H04L 41/0893* (2013.01)

(58) Field of Classification Search
None
See application file for complete search history.

(56) References Cited

U.S. PATENT DOCUMENTS

2020/0310789 A1    10/2020   Zhou et al.

FOREIGN PATENT DOCUMENTS

| JP | 2014-038610 A | 2/2014 |
|---|---|---|
| KR | 10-1374120 B1 | 3/2014 |
| KR | 10-2019-0109795 A | 9/2019 |
| KR | 10-2210429 B1 | 2/2021 |
| KR | 10-2289100 B1 | 8/2021 |

OTHER PUBLICATIONS

"Rancher K3s Advance options and Configuration", Oct. 26, 2020, Rancher.com, retrieved via Wayback Machine. (Year: 2020).*
Van-Cuong Le et al., Lightweight K3S Tool for Internet of Things Environment, Journal of the Korean Society of Communications, 2021, vol. 46, No. 11, 7pages.
Kubernetes cluster configuration, Jan. 28, 2021, <URL:https://kingds.tistory.com/74>, 5pages.

* cited by examiner

*Primary Examiner* — Qing Yuan Wu
(74) *Attorney, Agent, or Firm* — Park, Kim & Suh, LLC

(57) ABSTRACT

Disclosed is an integrated clustering system including a master node that sets environment setting for clustering and generate an access token by installing a management program, a plurality of worker nodes that set environment setting based on an environment variable including an IP address of the master node and the access token and perform clustering with the master node by installing the management program, and a system control unit that extracts runtimes of clustering groups including the master node and the plurality of worker nodes which are clustered, and compares the runtime of one of the clustering groups with the runtimes of other clustering group than the one clustering group.

11 Claims, 5 Drawing Sheets

INTEGRATED CLUSTERING SYSTEM

STATEMENT REGARDING GOVERNMENT SPONSORED RESEARCH OR DEVELOPMENT

The present disclosure is derived from research conducted by university ICT research center fostering work by the Ministry of Science ICT and Future Planning: [Project No.: 1711152520, Research management institution: Research management institution: Institute for Information & Communications Technology Planning & Evaluation (IITP), Project title: technology development and professional manpower training for Internet infrastructure system, Host institution: Soongsil University Industry-University Cooperation Foundation, research period: 2022.01.01~2022.12.31, contribution rate: ½] and the Information Communication Broadcasting Innovation manpower fostering work by the Ministry of Science ICT and Future Planning by the Ministry of Science ICT and Future Planning: [Project No.: 1711152558, Sub-project No.: 2021-0-02046-002, Research management institution: Research management institution: Institute for Information & Communications Technology Planning & Evaluation (IITP), Project title: 6H Next-generation mobile communication technology development, Host institution: Kyunghee University Industry-University Cooperation Foundation, research period: 2021.07.31~2028.12.31, contribution rate: ½]. On the other hand, there is no property interest of the Korean government in any aspect of the present disclosure.

CROSS-REFERENCE TO RELATED APPLICATIONS

This application claims priority under 35 U.S.C. § 119 to Korean Patent Application No. 10-2021-0127379 filed on Sep. 27, 2021, in the Korean Intellectual Property Office, the disclosures of which are incorporated by reference herein in their entireties.

BACKGROUND

Embodiments of the present disclosure described herein relate to an integrated clustering system for automatically clustering a plurality of IoT devices.

In general, many applications are being developed to process massive data generated from sensors, actuators, and devices corresponding to IoT devices. In this case, Kubernets (K8s) is used to effectively manage and orchestrate numerous applications used in IoT devices.

The Kubernets (K8s) requires system requirements that are too high to be installed and operated in IoT devices with limited resources, so technologies such as the Rancher K3s program are being utilized these days. However, to cluster a plurality of IoT devices using the technologies as the Rancher K3s program, there is inconvenience in that the user has to manually configure and install the requirements of the K3s program.

The Kubernets (K8s) requires too high system requirements to be installed and operated in IoT devices with limited resources, so technologies such as the Rancher K3s program are being utilized these days. However, to cluster a plurality of IoT devices using the technologies as the Rancher K3s program, there is inconvenience in that the user has to manually configure and install the requirements of the K3s program.

Accordingly, there is a need for a technology for installing the K3s program in IoT devices and automatically performing clustering between IoT devices.

SUMMARY

Embodiments of the present disclosure provide an integrated clustering system for automatically clustering a plurality of IoT devices.

According to an embodiment, an integrated clustering system includes at least one processor, wherein the at least one processor includes a master node that sets first environment setting based on a first environment variable for clustering and generate an access token by installing a management program, a plurality of worker nodes that set second environment setting based on a second environment variable including an IP address of the master node and the access token and perform clustering with the master node by installing the management program, and a system control unit that extracts runtimes of clustering groups including the master node and the plurality of worker nodes which are clustered, and compares the runtime of one of the clustering groups with the runtimes of other clustering group than the one clustering group.

Further, the system control unit may set a first runtime during which a container provided in any one worker node among the plurality of worker nodes operates and cluster the master node and each of the plurality of worker nodes by setting the first runtime to the runtime during which a container provided in each of the other worker nodes than the any one worker node operates.

Further, the system control unit may reinstall the management program by resetting the first environment variable, and perform the clustering of the master node and each of the plurality of worker nodes using the access token, when the runtime of at least one of the clustering groups is not identical.

Further, the system control unit may determine that the master node and each of the plurality of worker nodes are clustered when the runtimes of the clustering groups are identical.

Further, the master node may include a scheduler unit that generates pod data including the IP address of the master node, the access token, and port information of the plurality of worker nodes based on the first environment variable of the master node and a first tunnel proxy unit that wirelessly transmits the container including the pod data.

Further, the master node may include a scheduler unit that generates pod data including the IP address of the master node, the access token, and port information of the plurality of worker nodes based on the first environment variable of the master node and a first tunnel proxy unit that wirelessly transmits the container including the pod data.

Further, the system control unit may activate swap memories of the master node and the plurality of worker nodes.

According to an embodiment, a method of controlling an integrated clustering system including a master mode, a plurality of worker nodes and a system control unit which are performed by at least one processor, the method includes setting, by the mater node, first environment setting based on a first environment variable for performing clustering and generating an access token by using a management program, performing, by each of the plurality of worker nodes, second environment setting based on a second environment variable including an IP address of the master node and the access token and performing clustering with the master node by installing the management program, and extracting, the system control unit, runtimes of clustering groups each including the master node and the plurality of worker nodes which are clustered, and comparing the runtime of one of the clustering groups with the runtimes of other clustering group than the one clustering group.

Further, the comparing of the runtime of one of the clustering groups with the runtimes of other clustering group than the one clustering group may include setting, by the system control unit, a first runtime during which a container provided in any one worker node among the plurality of worker nodes operates; and clustering, by the system control unit, the master node and each of the plurality of worker nodes by setting the first runtime to the runtime during which a container provided in each of the other worker nodes than the any one worker node operates.

Further, the extracting of the runtimes of clustering groups each including the master node and each of the plurality of worker nodes may include reinstalling the management program by resetting the first environment variable, and performing the clustering of the master node and each of the plurality of worker nodes using the access token, when the runtime of at least one of the clustering groups is not identical.

According to an embodiment, a computer-readable non-transitory recording medium recording a program for executing the method of controlling the integrated clustering system according to the present disclosure is provoded.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, with reference to the accompanying drawings, various embodiments of the present disclosure will be described in detail such that those of ordinary skill in the art can easily carry out the present disclosure. The present disclosure may be embodied in several different forms and is not limited to the embodiments described herein.

In order to clearly explain the present disclosure, parts irrelevant to the present disclosure are omitted, and the same reference numerals are assigned to the same or similar elements throughout the specification. Accordingly, the reference numerals described above may be used in other drawings as well.

Further, in the drawings, a size, and a thickness of each element are arbitrarily illustrated for convenience of description, and the present disclosure is not necessarily limited to those illustrated in the drawings. In the drawings, the thicknesses of layers and regions are enlarged for clarity.

The expression "the same" means to "substantially the same". That is, it may be the same degree to the extent that ordinary knowledge those of ordinary skill in the art can convince that they are the same. Other expressions may be expressions in which "substantially" is omitted.

Figure 1:
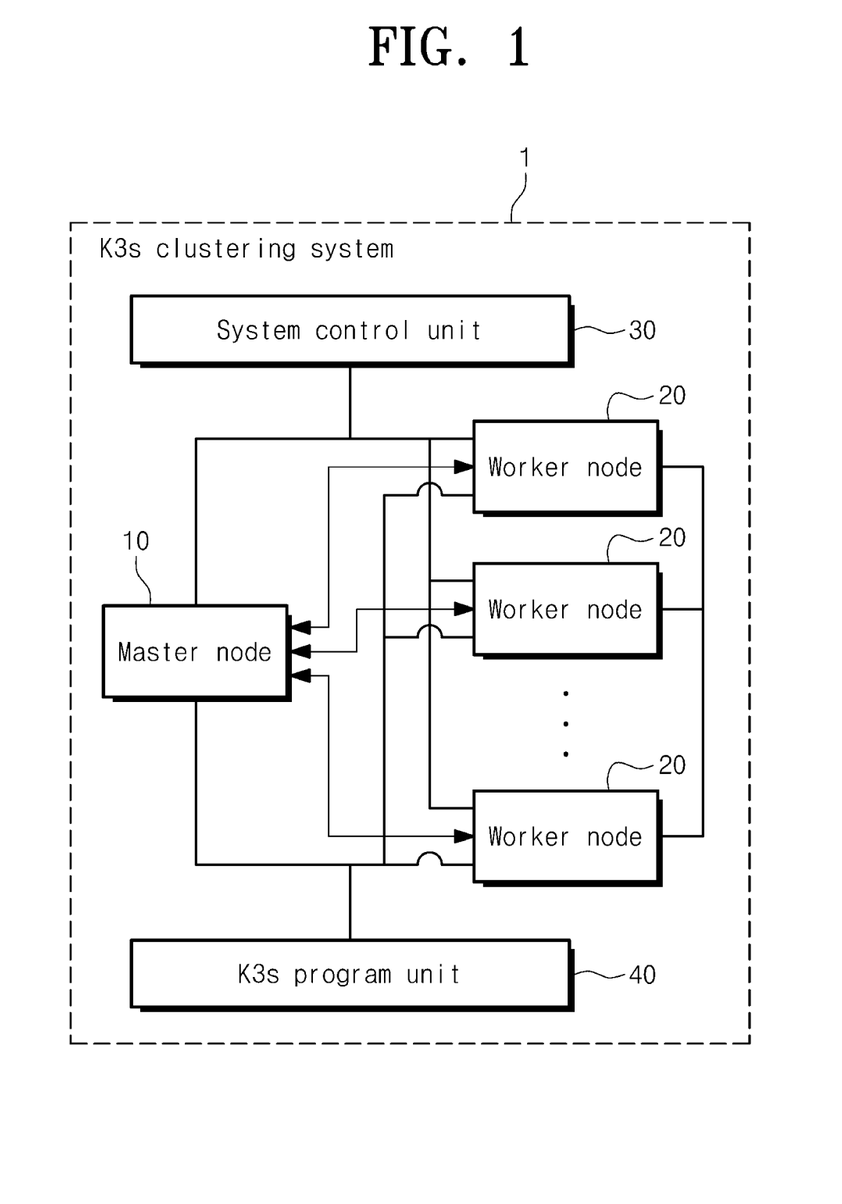
FIG. 1 is a diagram for describing an integrated clustering system according to an embodiment of the present disclosure.

FIG. 1 is a diagram for describing an integrated clustering system according to an embodiment of the present disclosure.

The integrated clustering system (K3s clustering system) 1 according to an embodiment of the present disclosure may include at least one processor.

The at least one processor may include a master node 10, a worker node 20, a system control unit 30, and a management program installation unit (K3s program unit) 40.

The master node 10 may be clustered with a plurality of worker nodes 20, individually. Clustering refers to connection or coupling of any one master node 10 for controlling a plurality of IoT devices (or worker nodes 20) and a plurality of worker nodes 20. That is, the master node 10 may be clustered with each of the plurality of worker nodes 20 to orchestrate or control the plurality of worker nodes 20.

The master node 10 may be subjected to environment setting based on variables for clustering. In this case, the environment setting refers to setting the environment of the master node 10 necessary for the master node 10 to cluster with each of the plurality of worker nodes 20. Hereinafter, the variables for setting an environment in the master node 10 are referred to as first environment variables, and it is assumed that the master node 10 is subjected to first environment setting based on the first environment variables.

A management program for performing clustering with each of the plurality of worker nodes 20 may be installed in the master node 10 on which the first environment setting has been completed. The master node 10 may be clustered with each of the plurality of worker nodes 20 using a management program.

Specifically, the master node 10 may have a management program installed, and generate an access token, which is a medium for performing clustering with the plurality of worker nodes 20, based on the management program. The master node 10 may be clustered with each of the plurality of worker nodes 20 by using the access token generated by the master node 10 as a medium for performing clustering with each of the plurality of worker nodes 20.

Each of the plurality of worker nodes 20 may be subjected to environment setting using variables including the IP address of the master node 10, the access token generated in the master node 10, and port information of each of the plurality of worker nodes 20. That is, since the environment of the plurality of worker nodes 20 is set based on the IP address of the master node 10, the access token, and the port information of the plurality of worker nodes 20, each of the plurality of worker nodes 20 may be clustered with the master node 10. Hereinafter, a variable for performing environment setting in each of the plurality of worker nodes 20 is referred to as a second environment variable, and it is assumed that the plurality of worker nodes 20 are subjected to second environment setting based on the second environment variable.

The system control unit 30 may calculate a first environment variable and a second environment variable for clustering the master node 10 and the plurality of worker nodes 20, respectively. The system control unit 30 may perform control such that the first environment setting and the second environment setting of the master node 10 and the plurality of worker nodes 20 are completed based on the first environment variable and the second environment variable.

The system control unit 30 may perform control such that the master node 10 in which the management program is installed and each of the plurality of worker nodes 20 are clustered. Specifically, the system control unit 30 may set a runtime during which a container 28 (see FIG. 2) provided in one among the plurality of worker nodes 20 operates to a first runtime, which is a reference runtime. The system control unit 30 may set the first runtime during which the containers 28, respectively provided in the plurality of worker nodes other than the one worker node, operate as a first runtime.

The system control unit 30 may detect the operation of the container 28 (refer to FIG. 2) operating in the plurality of clustered worker nodes 20 to determine whether clustering of the master node 10 and each of the plurality of worker nodes 20 is performed.

Specifically, the system control unit 30 may measure the runtimes of the containers 28 operating in the plurality of clustered worker nodes 20. When the runtime of at least one of the plurality of clustered worker nodes 20 is not identical, the system control unit 30 may determine that the master node 10 and each of the plurality of worker nodes 20 have not been clustered.

In this case, the system control unit 30 may again set the first environment variable of the master node 10 to reinstall the management program. The system control unit 30 may re-perform the clustering of the master node 10 and each of the plurality of worker nodes 20 by using a newly-generated access token.

When all the runtimes of the clustering group are the same, the system control unit 30 may determine that the master node 10 and each of the plurality of worker nodes 20 are clustered.

In this case, the system control unit 30 may perform control such that the clustering of the master node 10 and the plurality of worker nodes 20 are maintained.

The system control unit 30 may deactivate a swap memory 25 (see FIG. 2) included in each of the plurality of worker nodes 20. The system control unit 30 may perform control such the data is stored only in a memory unit 26 of the plurality of worker nodes 20 by inactivating the swap memory 25.

Figure 2:
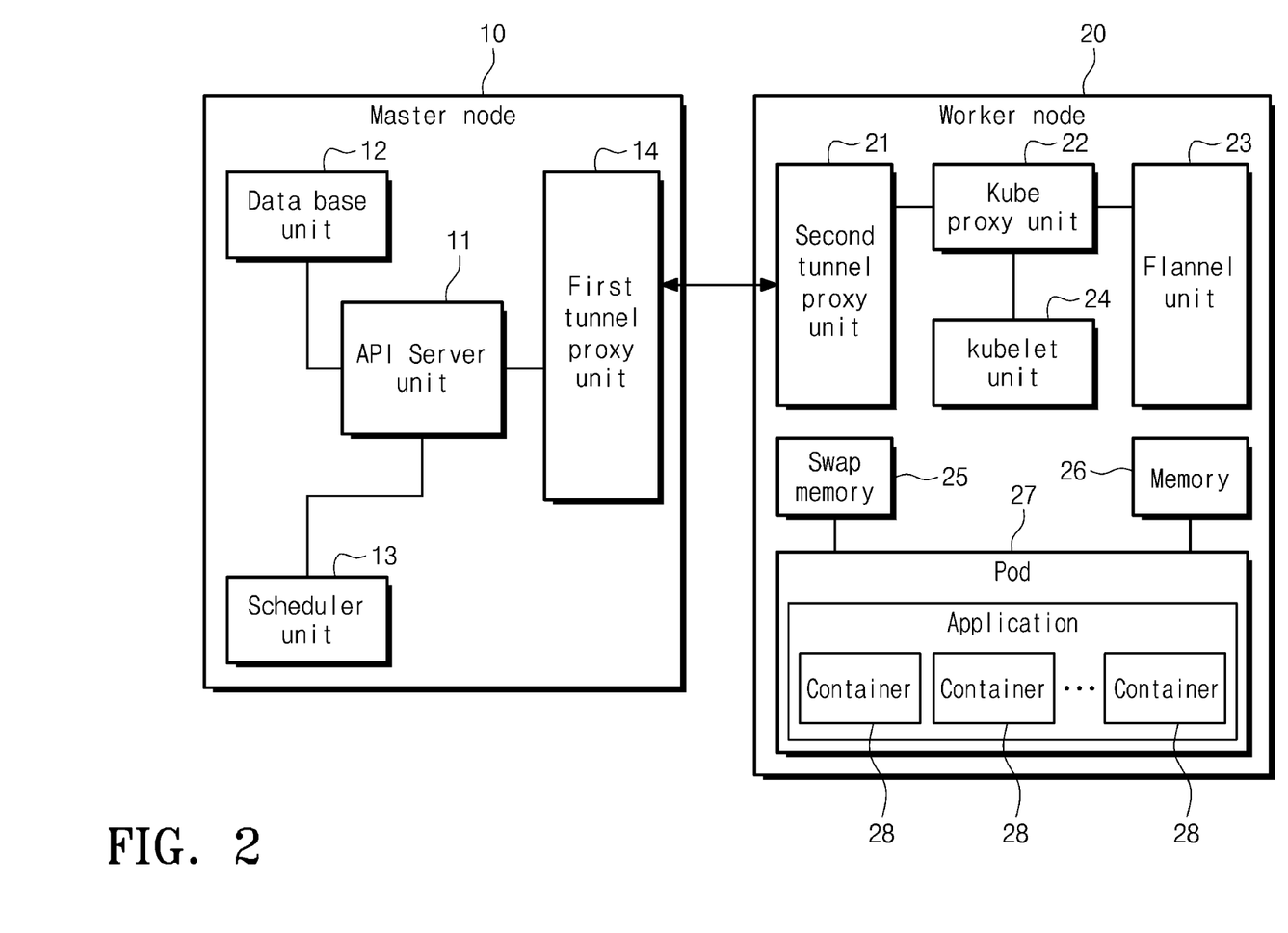
FIG. 2 is a diagram for describing the components of a master node and a worker node according to an embodiment of the present disclosure.
Figure 3:
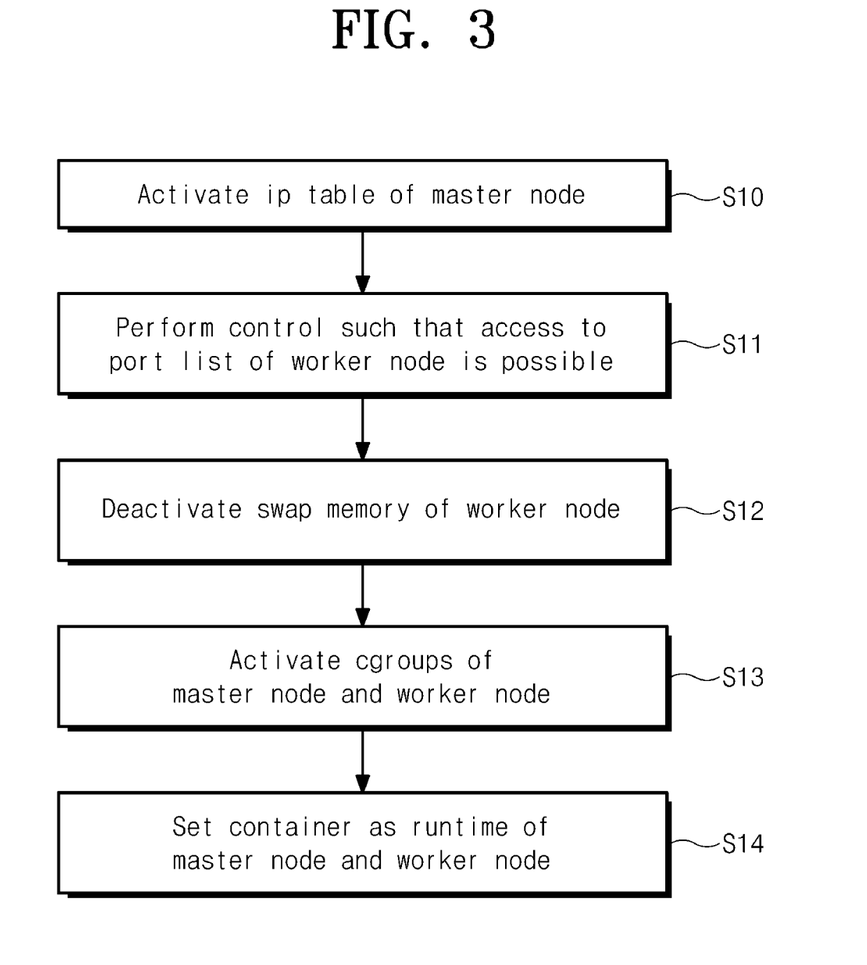
FIG. 3 is a diagram for describing a process of setting the environment of a master node and a worker node according to an embodiment of the present disclosure.

A process in which the system control unit 30 determines the first environment variable and the second environment variable to cluster the master node 10 and each of the plurality of worker nodes 20, and performs control to complete the first environment setting and the second environment setting of the master node 10 and the plurality of worker nodes 20 based on the first environment variable and the second environment variable and a process in which in which the system control unit 30 performs control such that the master node 10 and each of the plurality of worker nodes 20 are clustered will be described in detail below with reference to FIGS. 2 and 3.

In addition, a process in which the system control unit 30 determines whether to perform clustering of the master node 10 and each of the plurality of worker nodes 20 using data about a plurality of clustering groups in which the management program is installed will be described in detail below with reference to FIG. 6.

The management program installation unit 40 may store a management program to be installed in the master node 10 on which the first environment setting has been completed. The management program installation unit 40 may provide a management program to each of the plurality of worker nodes 20 on which the second environment setting has been completed. In this case, the management program refers to a program necessary to perform clustering of one master node 10 and the plurality of worker nodes 20, and may include Rancher K3s, or the like, but the present disclosure is not limited thereto.

FIG. 2 is a diagram for describing the components of a master node and a worker node according to an embodiment of the present disclosure.

The master node 10 may include an API server unit 11, a database unit 12, a scheduler unit 13, and a first tunnel proxy unit 14.

The worker node 20 may include a second tunnel proxy unit 21, a kube proxy unit 22, a flannel unit 23, the swap memory 25, a kubelet unit 24, the memory unit 26, and a pod 27.

The second tunnel proxy unit 21, the kube proxy unit 22, the flannel unit 23, the swap memory 25, the kubelet unit 24, the memory unit 26, and the pod 27 may be performed by at least one processor.

The API server unit 11 may perform first environment setting based on the first environment variable calculated by the system control unit 30. The API server unit 11 may install a management program provided by the management program installation unit 40. The API server unit 11 may generate an access token, which is a medium for performing clustering, based on the management program. The API server unit 11 may perform clustering with each of the plurality of worker nodes 20 by using the access token.

The database unit 12 may store the first environment variable. The database unit 12 may store data related to the management program. The database unit 12 may store the access token, which is a medium for performing clustering.

The scheduler unit 13 may generate pod data including the IP address of the master node 10, the access token, and the port information of the plurality of worker nodes 20. In this case, the pod data generated by the scheduler unit 13 may be stored in each of the containers 28 provided in the pod 27 of the worker node 20 through wireless data transmission. The scheduler unit 13 may perform scheduling such that the pod 27 is allocated to at least one worker node 20 according to a user's selection.

The first tunnel proxy unit 14 may perform wireless data transmission between the master node 10 and the worker node 20. The first tunnel proxy unit 14 may perform wireless data transmission to the second tunnel proxy unit 21 of the worker node 20. The first tunnel proxy unit 14 may wirelessly transmit, to the second tunnel proxy unit 21 of the worker node 20, the pod data including the IP address of the master node 10, the access token, and the port information of the plurality of worker nodes 20.

The second tunnel proxy unit 21 may perform wireless data reception between the worker node 20 and the master node 10. The second tunnel proxy unit 21 may wirelessly receive data from the first tunnel proxy unit 14 of the master node 10. The second tunnel proxy unit 21 may wirelessly receive, from the first tunnel proxy unit 14 of the master 10, the pod data including the IP address of the master node 10, the access token, and the port information of the plurality of worker nodes 20.

The kube proxy unit 22 may perform a load balancing function. Load balancing may mean distributing the pod data transmitted wirelessly from the master node 10 to the plurality of worker nodes 20. That is, the kube proxy unit 22 may perform load balancing such that pod data corresponding to the capacity of the memory unit 26 is distributed to the plurality of worker nodes 20.

The flannel unit 23 may support network communication between the pods 27 provided in the plurality of worker nodes 20. The flannel unit 23 may support network communication between the containers 28 provided in the plurality of worker nodes 20. The flannel unit 23 may support network communication between the pods 27 and the containers 28 provided in the plurality of worker nodes 20.

The kubelet unit 24 may drive the pod 27 in the worker node 20. The kubelet unit 24 may drive the containers 28 included in the worker node 20. The kubelet unit 24 may install the management program in the worker node 20 by driving the pod data included in the containers 28 and management program data.

The pod 27 may include the plurality of containers 28. The containers 28 included in the pod 27 may include data related to the management program. The containers 28 included in the pod 27 may include pod data. In this case, in the containers 28 included in the pod 27, environment may be set based on the pod data, and the management program may be executed and installed.

That is, the plurality of worker nodes 20 may set the second environment variable based on the pod data provided in the containers 28 and perform the second environment setting. A management program may be installed in the plurality of worker nodes 20 on which the second environment setting has been completed.

The memory unit 26 may store data related to the management program provided in the containers 28 and the pod data. The swap memory 25 is deactivated by the system control unit 30, so that pod data and/or management programs are not stored.

FIG. 3 is a diagram for describing a process of setting the environment of a master node and a worker node according to an embodiment of the present disclosure.

The master node 10, the plurality of worker nodes 20, and the system control unit 30 according to an embodiment of the present disclosure may be executed by at least one processor.

In step S10, the system control unit 30 may activate an IP table of the master node 10.

Specifically, since each of the plurality of worker nodes 20 performs the second environment setting using the second environment variable including the IP address of the master node 10 as described above with reference to FIG. 1, it is needed to access the IP table of the master node 10. Accordingly, the system control unit 30 may activate the IP table of the master node 10 to access the IP address of the master node 10.

In step S11, the system control unit 30 may perform control such that access to the port list of each of the plurality of worker nodes 20 is possible.

Specifically, since each of the plurality of worker nodes 20 performs the second environment setting using the second environment variable including the port information of each of the plurality of worker nodes 20, it may be needed to access the port information of each of the plurality of worker nodes 20. Accordingly, the system control unit 30 may perform control such that access to the port list of each of the plurality of worker nodes 20 is possible so as to calculate port information of each of the plurality of worker nodes 20.

In step S12, the system control unit 30 may deactivate the swap memory 25 of each of the plurality of worker nodes 20.

Specifically, the system control unit 30 may deactivate the swap memory 25 included in each of the plurality of worker nodes 20 such that data is stored only in the memory unit 26 included in each of the plurality of worker nodes 20.

In step S13, the system control unit 30 may activate Cgroups (control groups) of the master node 10 and the plurality of worker nodes 20.

Specifically, the system control unit 30 may activate the kube proxy unit 22 included in each of the plurality of worker nodes 20 to perform a load balancing function. The kube proxy unit 22 may perform load balancing such that pod data corresponding to the capacity of the memory unit 26 is distributed to the plurality of worker nodes 20.

In step S14, the system control unit 30 may set a runtime, which is a time during which the containers 28 provided in any one worker node among the plurality of worker nodes 20 operate.

Specifically, the system control unit 30 may determine any one of the plurality of worker nodes 20 as a reference worker node and set the first runtime during which any one of containers 28 provided in the reference worker node operates, as a reference runtime.

In addition, the system control unit 30 may set the first runtime, which is the time during which any one of the containers 28 provided in the reference worker node operates, as a runtime during which the containers 28 provided in the plurality of worker nodes other than the reference worker node operate.

Figure 4:
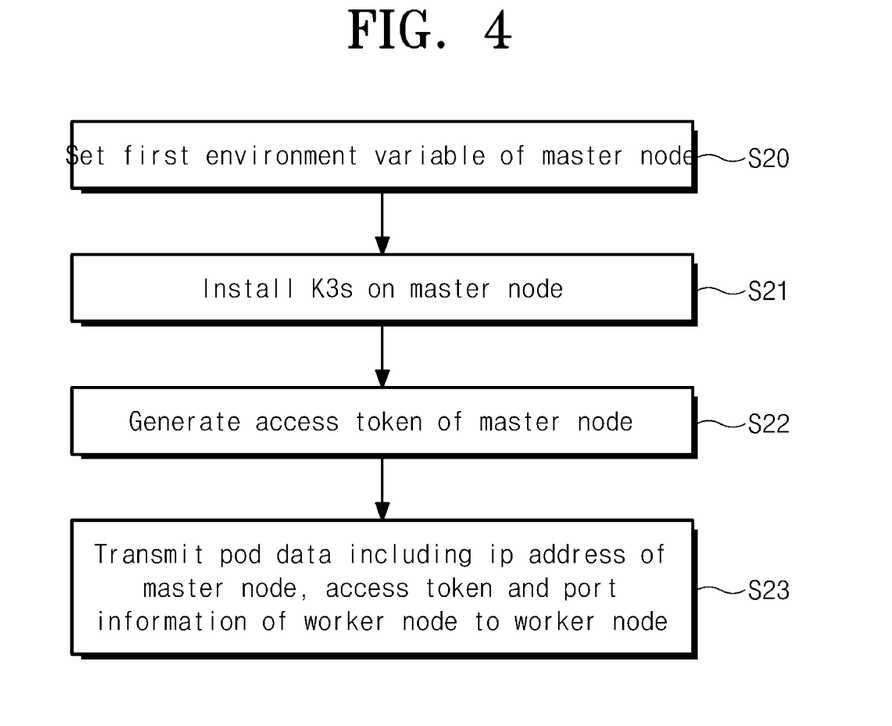
FIG. 4 is a diagram for describing a process of installing a management program on a master node according to an embodiment of the present disclosure.

FIG. 4 is a diagram for describing a process of installing a management program on a master node according to an embodiment of the present disclosure.

In step S20, the system control unit 30 may set an environment variable for clustering the master node 10 and the worker node 20.

Specifically, the system control unit 30 may determine a first environment variable for clustering the master node 10 and each of the plurality of worker nodes 20.

In this case, the master node 10 may perform first environment setting based on the first environment variable.

In step S21, the management program installation unit 40 may install the management program on the master node 10.

Specifically, the management program installation unit 40 may store the management program to be installed in the master node 10 on which the first environment setting has been completed. The management program installation unit 40 may provide the management program to the master node 10 on which the first environment setting has been completed. The master node 10 on which the first environment setting has been completed may install the management program provided from the management program installation unit 40.

In step S22, the master node 20 may generate an access token.

The master node 10 on which the management program has been installed may generate an access token, which is a medium for performing clustering with the plurality of worker nodes 20.

In step S23, the master node 10 may send pod data including the IP address of the master node 10, the access token, and port information of each of the plurality of worker nodes 20 to each of the plurality of worker nodes 20.

Specifically, the API server unit 11 provided in the master node 10 may generate an access token, which is a medium for performing clustering, based on the management program installed in the master node 10.

The scheduler unit 13 provided in the master node 10 may generate pod data including the IP address of the master node 10, the access token, and the port information of the plurality of worker nodes 20. In this case, the pod data generated by the scheduler unit 13 may be stored in each of the containers 28 provided in the pod 27 of the worker node 20 through wireless data transmission.

Figure 5:
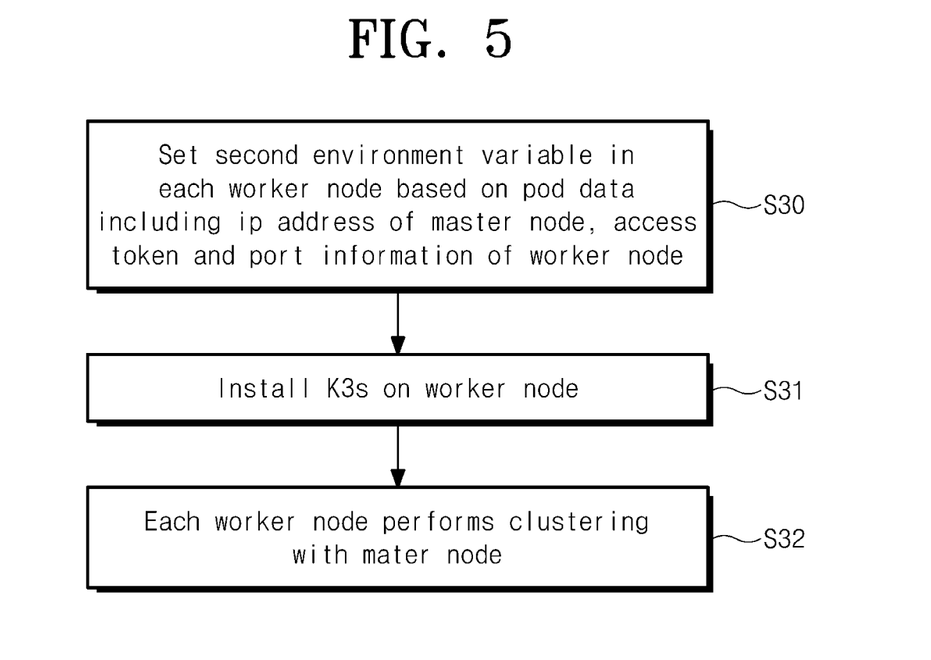
FIG. 5 is a diagram for controlling a process of installing a management program on a worker node according to an embodiment of the present disclosure.

FIG. 5 is a diagram for controlling a process of installing a management program on a worker node according to an embodiment of the present disclosure.

In step S30, a second environment variable is set in the plurality of worker nodes 20 based on the pod data including the IP address of the master node 10, the access token, and the port information and the plurality of worker nodes 20 each may be subjected to second environment setting.

In step S31, the management program installation unit 40 may install a management program on the plurality of worker nodes 20.

Specifically, the management program installation unit 40 may store the management program to be installed in each of the plurality of worker nodes 20 on which the second environment setting has been completed. The management program installation unit 40 may provide a management program to the plurality of worker nodes 20 on which the second environment setting has been completed. Each of the plurality of worker nodes 20 in which the second environment setting has been completed may install a management program provided from the management program installation unit 40.

In step S32, each of the plurality of worker nodes 20 may perform clustering with the master node 10.

The plurality of worker nodes 20 in which the second environment setting is completed and the management program is installed may perform clustering with the master node 10.

Figure 6:
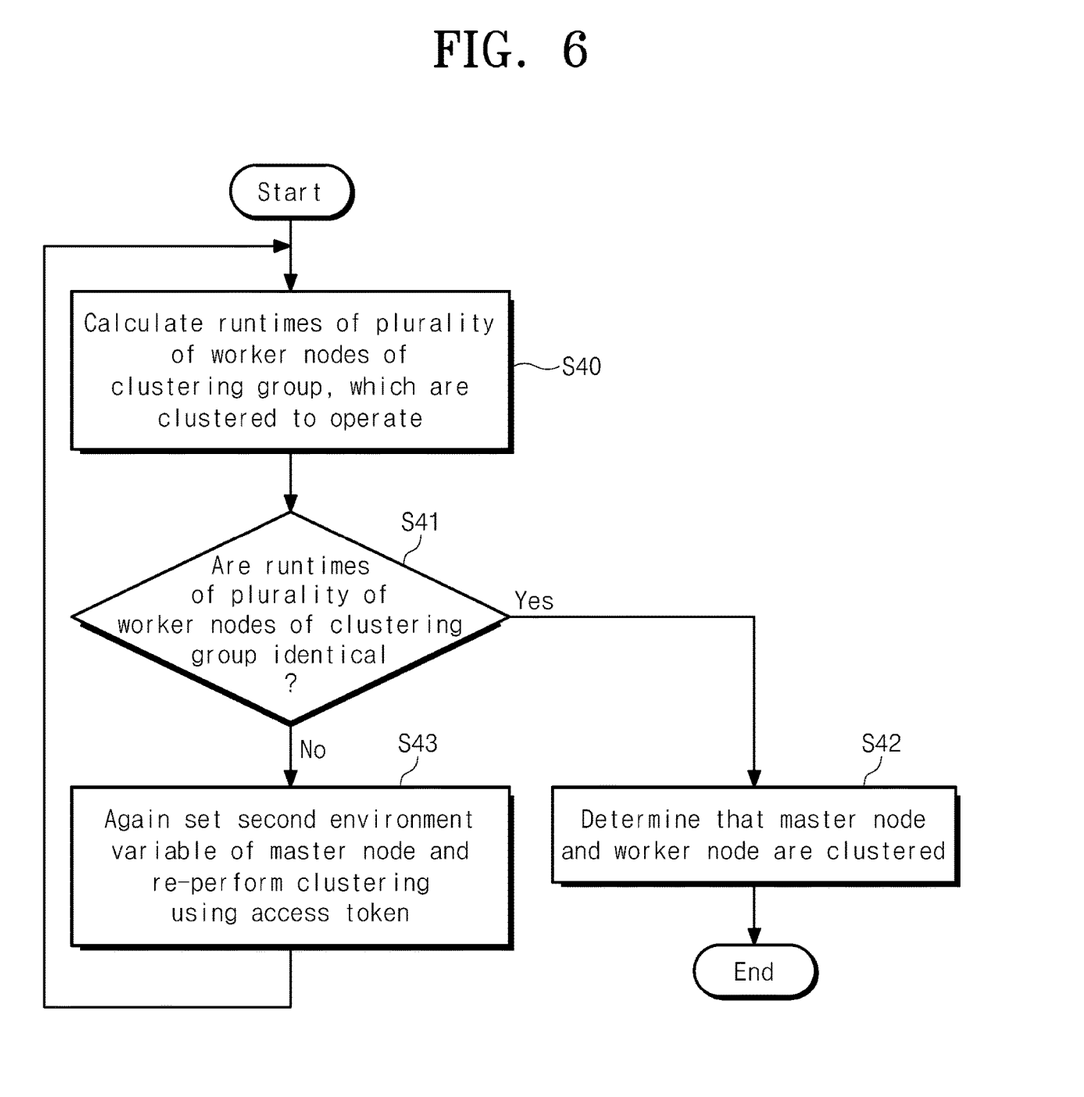
FIG. 6 is a diagram for describing a clustering process according to an embodiment of the present disclosure.

FIG. 6 is a diagram for describing a clustering process according to an embodiment of the present disclosure.

In step S40, the system control unit 30 may calculate the runtime of each clustering group.

Specifically, the system control unit 30 may calculate the runtimes of the containers 28 included in each of the plurality of worker nodes 20 of a clustering group that is clustered to operate.

In step S41, the system control unit 30 may determine whether the runtimes of the plurality of worker nodes 20 of the clustering group are identical to each other.

When the runtimes of the plurality of worker nodes 20 of the clustering group are all the same in step S42, the system control unit 30 may determine that the master node 10 and each of the plurality of worker nodes 20 has been clustered.

When the runtime of at least one of the worker nodes 20 of the clustering group is not identical, in step S43, the system control unit 30 may determine that the master node 10 and each of the plurality of worker nodes 20 have not been clustered.

the system control unit 30 may again set the first environment variable of the master node 10 to reinstall the management program. In addition, the system control unit 30 may re-perform the clustering of the master node 10 and each of the plurality of worker nodes 20 by using an access token newly generated in the master node 10.

The integrated clustering system according to the present disclosure is able to automatically cluster a plurality of IoT devices.

The drawings and the detailed description of the present disclosure as described above are merely examples of the present disclosure, which are only used for the purpose of explaining the present disclosure, and are not used to limit the meaning or the scope of the present disclosure described in the claims. Therefore, those skilled in the art will understand that various modifications and equivalent other embodiments are possible therefrom. Accordingly, the technical scope of the present disclosure should be defined by the accompanying claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An integrated clustering system comprising at least one processor,
wherein the at least one processor includes
a master node configured to set first environment setting based on a first environment variable for clustering and generate an access token by installing a management program;
a plurality of worker nodes configured to set second environment setting based on a second environment variable including an IP address of the master node and the access token and perform clustering with the master node by installing the management program; and
a system control unit configured to extract runtimes of the plurality of worker nodes which are clustered with the master node in a clustering group, and compare the extracted runtimes of the plurality of worker nodes to each other, wherein the extracted runtimes refer to an execution environment.

2. The integrated clustering system of claim 1, wherein the system control unit is further configured to:
set a first runtime during which a container provided in one of the plurality of worker nodes operates as a reference runtime; and
cluster the master node and each of the plurality of worker nodes by setting the reference runtime as an operating runtime during which a container provided in each of worker nodes other than the one worker node operates.

3. The integrated clustering system of claim 2, wherein the system control unit is further configured to reinstall the management program by resetting the first environment variable, and perform the clustering of the master node and each of the plurality of worker nodes using the access token, when the extracted runtimes of the plurality of worker nodes are not identical.

4. The integrated clustering system of claim 2, wherein the system control unit is configured to determine that the master node and each of the plurality of worker nodes are clustered when the extracted runtimes of the plurality of worker nodes are identical.

5. The integrated clustering system of claim 2, wherein the master node includes:
a scheduler unit configured to generate pod data including the IP address of the master node, the access token, and port information of the plurality of worker nodes based on the first environment variable of the master node; and
a first tunnel proxy unit configured to wirelessly transmit the container including the pod data.

6. The integrated clustering system of claim 5, wherein each of the plurality of worker nodes includes a second tunnel proxy unit configured to wirelessly transmit the container including the pod data, and
wherein each of the plurality of worker nodes performs second environment setting using the IP address of the master node and the access token as the second environment variable and installs the management program based on the second environment setting.

7. The integrated clustering system of claim 6, wherein the system control unit is configured to deactivate swap memories of the master node and the plurality of worker nodes.

8. A method of controlling an integrated clustering system including a master node, a plurality of worker nodes and a system control unit which are performed by at least one processor, the method comprising:
   setting, by the master node, first environment setting based on a first environment variable for performing clustering and generating an access token by using a management program;
   performing, by each of the plurality of worker nodes, second environment setting based on a second environment variable including an IP address of the master node and the access token and performing clustering with the master node by installing the management program; and
   extracting, by the system control unit, runtimes of the plurality of worker nodes which are clustered with the master node in a clustering group, and comparing the extracted runtimes of the plurality of worker nodes to each other, wherein the extracted runtimes refer to an execution environment.

9. The method of claim 8, further comprising:
   setting, by the system control unit, a first runtime during which a container provided in one of the plurality of worker nodes operates as a reference runtime; and
   clustering, by the system control unit, the master node and each of the plurality of worker nodes by setting the reference runtime as an operating runtime during which a container provided in each of worker nodes other than the one worker node operates.

10. The method of claim 9, further comprising:
    reinstalling the management program by resetting the first environment variable, and
    performing the clustering of the master node and each of the plurality of worker nodes using the access token, when the extracted runtimes of the plurality of worker nodes are not identical.

11. A computer-readable non-transitory recording medium recording a program for executing the method of controlling the integrated clustering system according to claim 8.

* * * * *